(12) United States Patent
Mendelovich et al.

(10) Patent No.: US 9,584,501 B2
(45) Date of Patent: *Feb. 28, 2017

(54) RESOURCE PROTECTION ON UN-TRUSTED DEVICES

(71) Applicant: MICROSOFT TECHNOLOGY LICENSING, LLC, Redmond, WA (US)

(72) Inventors: Meir Mendelovich, Kfar Saba (IL); Ron Matchoro, Hogla (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,562

(22) Filed: Jul. 17, 2015

(65) Prior Publication Data

US 2015/0326552 A1    Nov. 12, 2015

Related U.S. Application Data

(63) Continuation of application No. 13/732,526, filed on Jan. 2, 2013, now Pat. No. 9,106,634.

(51) Int. Cl.
*H04L 29/06* (2006.01)
*G06F 21/44* (2013.01)
*G06F 21/33* (2013.01)

(52) U.S. Cl.
CPC .............. *H04L 63/08* (2013.01); *G06F 21/33* (2013.01); *G06F 21/44* (2013.01)

(58) Field of Classification Search
CPC . H04L 63/08; H04L 63/20; H04L 9/32; H04L 9/3215; H04L 9/3223; H04L 9/3228

(Continued)

(56) References Cited

U.S. PATENT DOCUMENTS 6,006,333 A    12/1999 Nielsen
7,698,555 B2    4/2010 Jiang et al.
(Continued)

FOREIGN PATENT DOCUMENTS

CN    102316094 A    1/2012
GB    2355827 A    5/2011

OTHER PUBLICATIONS

"International Preliminary Report on Patentability Issued in PCT Application No. PCT/US2013/078397" Mailed Date: Jul. 16, 2015, 6 Pages.

(Continued)

*Primary Examiner* — Hadi Armouche
*Assistant Examiner* — Hee Song
(74) *Attorney, Agent, or Firm* — Kate Drakos; Micky Minhas

(57) ABSTRACT

Authenticating a client device to a service to allow the client device to access a resource provided by the service. A client device obtains a secondary credential that is associated with a primary credential and that is generated as being usable by a particular set of devices including the client device to indirectly gain access to the service through the primary credential. While outside of an enterprise network, the client device requests access to the service, including sending the secondary credential to an enterprise gateway. Based at least on sending the secondary credential to the enterprise gateway, the client device receives a resource from the service. The resource is received based at least on the enterprise gateway having forwarded the primary credential to the service after verifying that the secondary credential is valid and that the client device is in the particular set of client devices.

20 Claims, 2 Drawing Sheets

(58) Field of Classification Search
USPC .............. 726/6, 9, 26–29; 380/200–203, 227
See application file for complete search history.

(56) References Cited

U.S. PATENT DOCUMENTS

| | | | |
|---|---|---|---|
| 7,913,300 B1 | 3/2011 | Flank et al. | |
| 7,996,885 B2* | 8/2011 | Jaiswal | G06F 21/31 726/6 |
| 8,166,524 B2 | 4/2012 | Sentinelli | |
| 2003/0005299 A1 | 1/2003 | Xia et al. | |
| 2007/0143836 A1 | 6/2007 | Bowers et al. | |
| 2009/0165102 A1 | 6/2009 | Zagni | |
| 2009/0259588 A1 | 10/2009 | Lindsay | |
| 2010/0100928 A1* | 4/2010 | Gasparini | H04L 9/3213 726/1 |
| 2010/0223558 A1 | 9/2010 | Feng | |
| 2011/0078773 A1 | 3/2011 | Bhasin et al. | |
| 2011/0283338 A1 | 11/2011 | Yang et al. | |
| 2012/0159607 A1* | 6/2012 | Wei | H04L 63/0272 726/15 |
| 2012/0233675 A1* | 9/2012 | Hird | H04L 63/0838 726/6 |
| 2013/0145449 A1* | 6/2013 | Busser | G06F 21/31 726/7 |
| 2013/0298242 A1* | 11/2013 | Kumar | G06F 21/52 726/25 |
| 2014/0007222 A1* | 1/2014 | Qureshi | G06F 21/10 726/16 |
| 2014/0075493 A1* | 3/2014 | Krishnan | G06F 21/31 726/1 |
| 2014/0181909 A1* | 6/2014 | Birk | H04L 63/105 726/4 |
| 2014/0189782 A1 | 7/2014 | Mendelovich | |

OTHER PUBLICATIONS

Dinne, et al., "Two Way Mobile Authentication System", In Proceedings of Master of Science Thesis, Jun. 2010, 57 pages.

"Junos Pulse for Apple iPhone iOS 4.1", Retrieved on: Nov. 1, 2012, Available at: http://www.juniper.net/us/en/local/pdf/app-notes/3500191-en.pdf.

"External API—Implementation and Development Guideline", Retrieved on: Nov. 1, 2012, Available at: http://www.netregistry.com.au/support/articles/external-api-implementation-and-development-guideline.

"International Search Report & Written Opinion for PCT Patent Application No. PCT/US2013/078397", Mailed Date: Mar. 28, 2014, Filed Date: Dec. 31, 2013, 9 pages.

Office Action cited in U.S. Appl. No. 13/732,526 mailed Sep. 10, 2014.

Office Action cited in U.S. Appl. No. 13/732,526 mailed Jan. 2, 2015.

Notice of Allowance cited in U.S. Appl. No. 13/732,526 mailed Apr. 13, 2015.

Office Action issued in Chinese Patent Application No. 201380068358.1 mailed Dec. 28, 2016.

* cited by examiner

RESOURCE PROTECTION ON UN-TRUSTED DEVICES

CROSS-REFERENCE TO RELATED APPLICATIONS

This application is a continuation of U.S. patent application Ser. No. 13/732,526, filed Jan. 2, 2013, and entitled "RESOURCE PROTECTION ON UN-TRUSTED DEVICES," the entire content of which is incorporated by reference herein in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Current networks have allowed many new and different types of devices to be networked. Additionally, there is a desire to have mobility with networked devices. Mobility continues to evolve, as smartphones and tablets are more prevalent on business enterprise networks. Many organizations that wish to leverage the opportunity to increase employee productivity are embracing the mobile work style, and enabling information workers to access enterprise resources from their mobile devices.

While this trend brings new opportunities to improve employee effectiveness, it also creates new security risks for IT administrators as in many cases an employee can store enterprise credentials (e.g. a username and password pair) on their mobile devices. For example, most mobile email clients that use Active Sync available from Microsoft Corporation of Redmond Wash. require enterprise credentials. These credentials can be easily extracted from the mobile device. For example, the device may be stolen, the device may host a mobile application that turns out to be Trojan horses that collects saved passwords or log keystrokes. This can be particularly dangerous given that often an enterprise user may use the same credentials to access most, if not all, of the resources available to the enterprise user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein may be practiced in a computing environment including a client device and an enterprise gateway of an enterprise network. The client device obtains a secondary credential. The secondary credential is associated with a primary credential that is usable from within the enterprise network to directly gain access to a service of the enterprise network. The secondary credential was generated within the enterprise network as being usable by a particular set of client devices that includes the client device to indirectly gain access to the service through the primary credential, and as being unusable by any other client devices not included in the particular set of client devices to gain access to the service.

While outside of the enterprise network, the client device requests access to the service, including sending the secondary credential to the enterprise gateway. Based at least on sending the secondary credential to the enterprise gateway, the client device receives a resource from the service. The resource is received from the service based at least on the enterprise gateway having forwarded the primary credential to the service after verifying that the secondary credential is valid and that the client device is in the particular set of client devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality to protect general purpose primary credentials by issuing dedicated secondary credentials that will be used only from specific contexts, such as specific enterprise interfaces, specific protocols, specific mailboxes, etc. (e.g. a credential may only be used from the ActiveSync interface available from Microsoft® Corporation of Redmond Wash.) and/or devices and that can have a separate expected lifecycle. If these secondary credentials are compromised, the damage will be limited. In particular, the damage may be limited to only the device to which the secondary credentials apply, to only those certain enterprise interfaces to which the secondary credentials apply, and/or to the limited time period for which the secondary credentials are valid. Thus, damage can be limited as compared to the cased when a primary enterprise credentials, that allows access to an entire enterprise systems or large parts of an enterprise system, are compromised.

Figure 1:
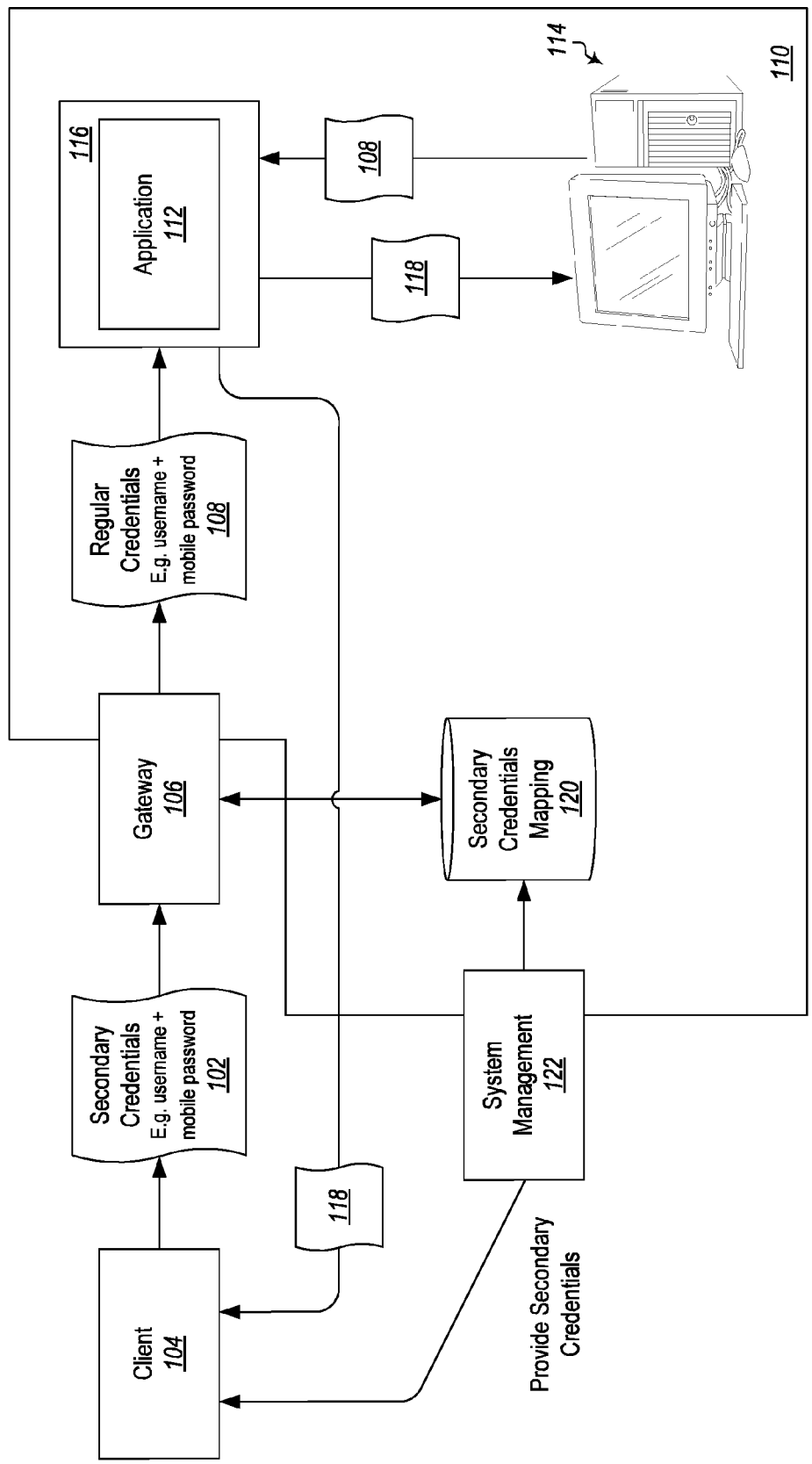
FIG. 1 illustrates a system for managing user primary and secondary credentials.

Thus, and with reference to FIG. 1, some embodiments implement a secondary credential 102 (such as a password) for untrusted devices, such as device 104. For example, the device 104 may be a mobile device.

Embodiments may implement a gateway 106 that replaces the secondary credential 106 with the primary credential 108 (e.g., the primary enterprise wide credential). The co-existence of a primary credential 108 and secondary credential 102 may be implemented without changing the device 104 internal systems or various services or systems on an enterprise network 110 by implementing a gateway 106. The gateway 106 may be separate from the client 104. The gateway 106 may be able to proxy the traffic relevant to applications 112 in the enterprise network 110 and will change the secondary credential 102 with the primary credential 108 to allow access to enterprise resources.

In many cases, this gateway 106 resides on the edge of the enterprise network 110. The gateway 106 may be implemented in a fashion such that all outside traffic must go thru the gateway 106 to enter the enterprise network 110. As such, access to an application 112 from within the enterprise network 110 will require use of the primary credential 108. For example, FIG. 1 illustrates that a user may use an on premises corporate system 114, such as a desktop or laptop, located on-premises at an enterprise and connected to the enterprise network 110 by hardware and communication lines under the direct control of the enterprise network 110 administrator. In this case, as illustrated, the primary credential 108 can be sent from the corporate system 114 to a service 116 to access resources 118 of an application 112.

Alternatively, when a user wishes to access resources 118 provided by the application 112 when connected remotely, the special secondary credential 102 can be used by the client system 104 sending the secondary credential 102 to the gateway 106 where it is used to substitute the primary credential 108 to allow the resource 118 to be returned to the client system 104. Notably, embodiments may be implemented where not all traffic is sent to the gateway 106. Rather, in some embodiments, only certain types of traffic, or traffic intended for certain applications may be sent to the gateway 106. For example, email and calendaring data may be sent to the gateway 106 while other traffic is not routed through the gateway 106.

The secondary credential 102 may be subject to different policies than the primary credential 108. For example, the secondary credential 102 may be more temporally limited that the primary credential. For example, the secondary credential may be valid for a shorter period of time that the primary credential 108. Alternatively or additionally, the secondary credential 102 may have more restrictive temporal limits than the primary credential 108 on when it may be used. For example, while the primary credential 108 may be used any time of the day or night while the secondary credential 102 may be limited to, for example, between 5:00 PM and 9:00 AM. These policies could be enforced by the gateway 106.

The gateway 106 may be able to enforce service or application level restrictions with respect to the secondary credential 102. For example, while the primary credential 108 may be used to access virtually any resource available to a given user to which the primary credential 108 belongs, the gateway 106 may restrict the same user accessing enterprise resources through the device 104 and using the secondary credential 102 to a limited set of applications or resources. For example, the gateway may substitute the primary credential 108 when requests are made for email resources, but may refuse to substitute the primary credential for requests that are made from the client 104 for sensitive database resources. Some such embodiments may be role based. For example, the gateway 106 may enforce fewer (or no) restrictions on the CEO or the primary network administrator of the enterprise, while more restrictions are enforced on a data entry clerk.

The gateway 106 may perform the credential swap of the secondary credential 102 for the primary credential 108 based on a database 120 that correlates the primary credential 108 and the secondary credential 102 that are managed by a management system 122.

This management system 122 can allocate secondary credentials based on input provided to a user interface or/and its internal logic. The management system 122 can also define use and expiration policies. This management system will typically implement additional authentication logic to generate and provide secondary authentication to users and devices, such as devices 104. In an illustrative example, a user accesses the management system 122 using Web UI. The user is authenticated using smartcard or other authentication. The user then receives, through the Web UI, secondary credentials in the form of an ad-hoc password that is valid for a week for ActiveSync. Thus, the user is able to obtain a secondary credential 102 that can be used with an untrusted device 104, where the secondary credential is limited in time as to how long it is valid as well as being limited to certain applications.

Further, in some embodiments, the secondary credential 102 may be generated in a fashion that only allows it to be used with certain devices (e.g. device 104) or certain channels. For example, the gateway 106 may be able to enforce restrictions that allow the secondary credential 102 to be used with a specific device 104 or set of devices, while excluding its use with other devices. The gateway 106 may be able to alternatively or additionally be able to limit the secondary credential 102 to use with certain communication channels. For example, the secondary credential may be able to be used with a particular home network of a user, but is not able to be used when the device is connected to certain public Wi-Fi networks or cellular networks.

The secondary credentials, such as credential 102 may be generated in various different ways. For example, in some embodiments, the secondary credential 102 may be generated by using a secret at the management system 122 and the primary credentials 108. A hash, or other calculation, may be performed on using the secret at the management system and the primary credentials to generate the secondary credential 102.

In another embodiment, the secondary credential 102 may be selected or manually generated by a user after the user presents the primary credential 108 through a Web UI of the management system 122.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
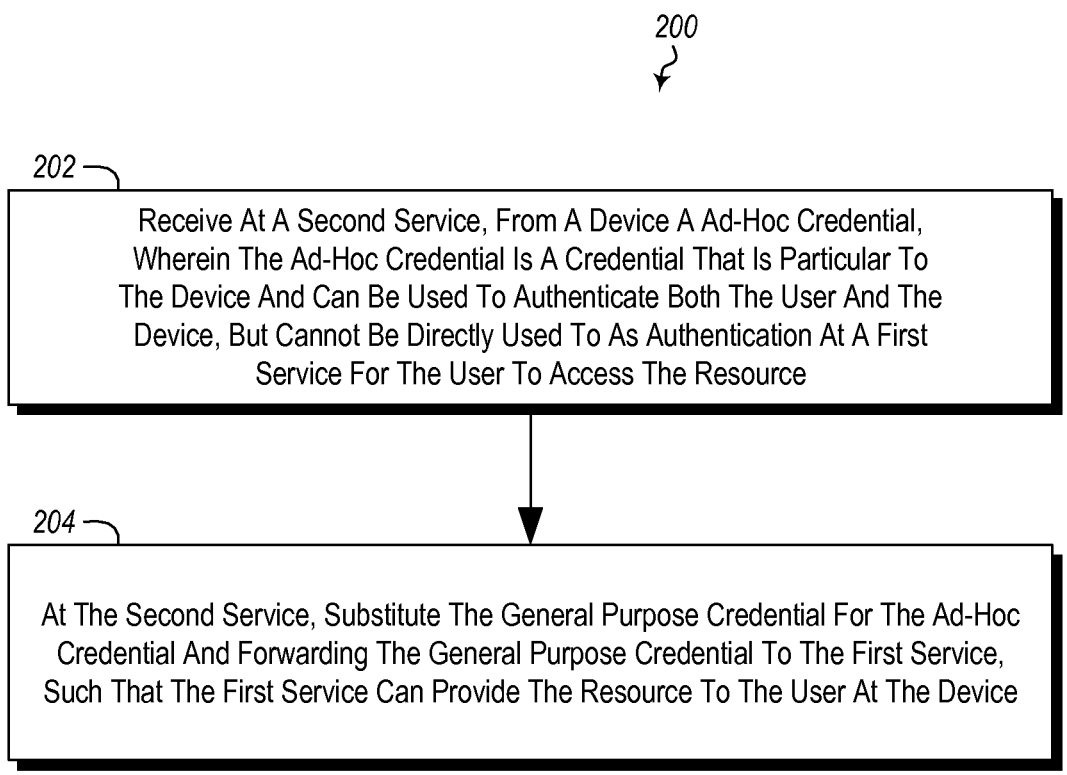
FIG. 2 illustrates a method for authenticating a user to a first service to allow the user to access a resource provided by the first service.

Referring now to FIG. 2, a method 200 is illustrated. The method 200 may be practiced in a computing environment. The method 200 includes acts for authenticating a user to a first service to allow the user to access a resource provided by the first service. The resource is a protected resource requiring a general purpose credential (e.g., a user name and/or password) to access the resource. For example, as illustrated in FIG. 1, a user may be able to access the resource 108 from the service 116 by presenting the primary credential 108.

The method includes receiving at a second service, from the device an ad-hoc credential (act 202). The ad-hoc credential is a credential that is particular to the device, and can be used to authenticate both the user and the device, but cannot be directly used to as authentication at the first service for the user to access the resource. For example the device 104 may receive from the management system 122 the secondary credential 102. The secondary credential 102 may be a credential that is specific to the device 104 in that the when the credential is used with the device 104 it can be used as authentication, but when used with other devices, it may not be used as authentication. In some embodiments, the credential must be used with one or more particular channels and may not be used with other channels. In some embodiments, the credential may be only valid for a single particular device, where in other embodiments it is valid for a pre-specified set of devices.

The method 200 further includes, at the second service, substituting the general purpose credential for the ad-hoc credential and forwarding the general purpose credential to the first service (act 204). For example, as illustrated in FIG. 1, the primary credential 108 is substituted for the secondary credential 102. The primary credential 108 is used obtain the resource 108 for the user at the device 104. Thus, act 204 may be performed such that the first service (e.g. service 116) can provide the resource to the user at the device (e.g. device 104).

The method 200 may be practiced where the ad-hoc credential is a credential that is particular to a given communication channel. For example, one secondary credential may be used for use with a public Wi-Fi network, whereas a different credential may be for use with a home network, whereas yet a different credential is for use with a cellular network, etc.

The method 200 may be practiced where the ad-hoc credential is temporally limited, such that the ad-hoc credential expires after a given period of time. Thus, for example, the secondary credential 102 may be only useful for a given period of time after issued or after its first use.

The method 200 may be practiced where use of the ad-hoc credential at the second service is limited by policy. For example, the policy may limit the use of the ad-hoc credential by time. For example, use of the credential may be limited to certain times of the day, for limited consecutive or total lengths of time, etc. In some embodiments the policy limits the use of the ad-hoc credential by limiting what resources can be accessed using the ad-hoc credential. For example, as explained above, the gateway 106 can limit what applications, services, or resources can be accessed when using the secondary credential 102. Embodiments may be implemented where the policy limits the use of the ad-hoc credential according to user role. As explained previously, the gateway 106 may be able to enforce restrictions whereby more privileged users are able to access a greater set of resources with secondary credentials that less privileged users are.

The method 200 may be practiced where the ad-hoc credential is generated by using the general purpose credential and a secret maintained by the second service to calculate the ad-hoc credential. As explained above, the management system 122 may generate the secondary credentials 102 by performing a calculation using a secret at the management server 122 and the primary credentials 108. Alternatively, the management system may randomly generate the secondary credentials and then associate them with the primary credentials. In yet another alternative, a user may be able to selected or provide their own secondary credential, which could then be associated with the primary credential by the management system 122.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A client device, comprising:
one or more hardware processors; and
one or more computer-readable media having stored thereon computer-executable instructions that are executable by the one or more processors, and that configure the client device to authenticate to an enterprise network, including computer-executable instructions that configure the client device to perform at least the following:
obtain a secondary credential, the secondary credential being associated with a primary credential that is usable from within the enterprise network to directly gain access to a service of the enterprise network, the secondary credential having been generated within the enterprise network as being usable by a particular set of client devices that includes the client device to indirectly gain access to the service through the primary credential and as being unusable by any other client devices not included in the particular set of client devices to gain access to the service;
while outside of the enterprise network, request access to the service, including sending the secondary credential to an enterprise gateway of the enterprise network; and
based at least on sending the secondary credential to the enterprise gateway, receive a resource from the service, the resource being received from the service based at least on the enterprise gateway having forwarded the primary credential to the service after verifying that the secondary credential is valid and that the client device is in the particular set of client devices.

2. The client device as recited in claim 1, the secondary credential having been generated within the enterprise network as being usable to indirectly gain access to the service through the primary credential only when the secondary credential is received over a particular set of communication channels.

3. The client device as recited in claim 2, the resource being received from the service based at least on the enterprise gateway also having verified that the secondary credential was received over a communication channel in the particular set of communication channels.

4. The client device as recited in claim 1, also including computer-executable instructions that configure the client device to send only traffic intended for the service to the enterprise gateway.

5. The client device as recited in claim 1, also including computer-executable instructions that configure the client device to obtain the secondary credential from a user.

6. The client device as recited in claim 1, also including computer-executable instructions that configure the client device to obtain the secondary credential from a management system in the enterprise network.

7. The client device as recited in claim 1, the secondary credential having been generated by a management system within the enterprise network using a secret at the management system in combination with the primary credential.

8. The client device as recited in claim 1, wherein the secondary credential is valid for a shorter period of time than the primary credential.

9. The client device as recited in claim 1, wherein the secondary credential grants limited access to services of the enterprise network as compared to the primary credential.

10. A system, comprising:
an enterprise gateway of an enterprise network, which includes one or more first hardware processors and one or more first computer-readable media storing first computer-executable instructions that configure the enterprise gateway to perform at least the following:
receive a secondary credential from a client device that is outside of the enterprise network, the secondary credential being associated with a primary credential that is usable from within the enterprise network to directly gain access to a service of the enterprise network, the secondary credential having been generated within the enterprise network as being usable by a particular set of client devices that includes the client device to indirectly gain access to the service through the primary credential and as being unusable by any other client devices not included in the particular set of client devices to gain access to the service;
verify that the secondary credential is valid;
verify that the client device is in the particular set of client devices; and when the secondary credential is valid and when the client device is in the particular set of client devices, forward the primary credential to the service; and the client device, which includes one or more second processors and one or more second computer-readable media storing second computer-executable instructions that configure the client device to perform at least the following:

obtain the secondary credential;

while outside of the enterprise network, request access to the service, including sending the secondary credential to the enterprise gateway; and based at least on sending the secondary credential to the enterprise gateway, receive a resource from the service.

11. The system as recited in claim 10, the secondary credential having been generated within the enterprise network as being usable to indirectly gain access to the service through the primary credential only when the secondary credential is received over a particular set of communication channels.

12. The system as recited in claim 11, wherein the first computer-executable instructions also configure the enterprise gateway to verify that the secondary credential was received over a communication channel in the particular set of communication channels prior to forwarding the primary credential to the service.

13. The system as recited in claim 10, wherein the second computer-executable instructions also configure the client device to send only traffic intended for the service to the enterprise gateway.

14. The system as recited in claim 10, wherein the second computer-executable instructions also configure the client device to obtain the secondary credential from a user.

15. The system as recited in claim 10, wherein the second computer-executable instructions also configure the client device to obtain the secondary credential from a management system in the enterprise network.

16. The system as recited in claim 10, wherein the secondary credential is generated by a management system within the enterprise network using a secret at the management system in combination with the primary credential.

17. The system as recited in claim 10, wherein the secondary credential is valid for a shorter period of time than the primary credential.

18. The system as recited in claim 10, wherein the secondary credential grants limited access to services of the enterprise network as compared to the primary credential.

19. A method, implemented at a client device that includes one or more processors, for authenticating to an enterprise network, the method comprising:

obtaining a secondary credential, wherein the secondary credential is associated with a primary credential that is usable from within the enterprise network to directly gain access to a service of the enterprise network, and wherein the secondary credential was been generated within the enterprise network as being usable by a particular set of client devices that includes the client device to indirectly gain access to the service through the primary credential and as being unusable by any other client devices not included in the particular set of client devices to gain access to the service;

while outside of the enterprise network, requesting access to the service, including sending the secondary credential to an enterprise gateway of the enterprise network; and based at least on sending the secondary credential to the enterprise gateway, receiving a resource from the service, wherein the resource is received from the service based at least on the enterprise gateway having forwarded the primary credential to the service after verifying that the secondary credential is valid and that the client device is in the particular set of client devices.

20. The method as recited in claim 19, wherein the secondary credential was generated within the enterprise network as being usable to indirectly gain access to the service through the primary credential only when the secondary credential is received over a particular set of communication channels, and wherein the resource is received from the service based at least on the enterprise gateway also having verified that the secondary credential was received over a communication channel in the particular set of communication channels.

* * * * *